United States Patent
Panchalingam et al.

(10) Patent No.: US 8,069,304 B2
(45) Date of Patent: Nov. 29, 2011

(54) DETERMINING THE PRESENCE OF A PRE-SPECIFIED STRING IN A MESSAGE

(75) Inventors: Murukanandam Kamalam Panchalingam, Santa Clara, CA (US); Nithish Mahalingam, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 1057 days.

(21) Appl. No.: 11/851,313

(22) Filed: Sep. 6, 2007

(65) Prior Publication Data

US 2008/0065822 A1 Mar. 13, 2008

(30) Foreign Application Priority Data

Sep. 8, 2006 (IN) .......................... 2002/DEL/2006

(51) Int. Cl.
 *G06F 12/00* (2006.01)
 *G06F 15/173* (2006.01)
 *G06F 17/00* (2006.01)
(52) U.S. Cl. . 711/108; 709/224; 709/238; 707/E17.039; 711/216; 711/217; 711/218
(58) Field of Classification Search .................. 711/108, 711/216, 217, 218; 709/224, 238; 707/E17.039
 See application file for complete search history.

(56) References Cited

U.S. PATENT DOCUMENTS

| | | | |
|---|---|---|---|
| 6,993,622 B2 * | 1/2006 | Khanna et al. | 711/108 |
| 7,051,078 B1 * | 5/2006 | Cheriton | 709/214 |
| 2003/0188089 A1 * | 10/2003 | Perloff | 711/108 |
| 2007/0115986 A1 * | 5/2007 | Shankara | 370/392 |
| 2008/0154852 A1 * | 6/2008 | Beyer et al. | 707/3 |
| 2008/0243941 A1 * | 10/2008 | Beyer et al. | 707/200 |

OTHER PUBLICATIONS

Dhamapurikar, S. et al. "Deep packet inspection using parallel bloom filters" Aug. 20-22, 2003, washington University in saint Louis, MO, USA, pp. 1-8.*

Dhamapurikar, S. et al. "Deep packet inspection using parallel bloom filters" Aug. 20-22, 2003, Washington University in Saint Louis, MO, USA, Abstract, p. 1.*

* cited by examiner

*Primary Examiner* — Kevin Ellis
*Assistant Examiner* — Mehdi Namazi
(74) *Attorney, Agent, or Firm* — Blakely, Sokoloff, Taylor & Zafman LLP

(57) ABSTRACT

A network device determines the presence of the pre-specified string in a message based on a sequence matching rule. A sequence represents non-contiguous portions of the message. A combination of content addressable memory, programmable processing units, and the programmable control unit may determine the presence of the pre-specified string in the message by comparing the non-contiguous portions of the message. Such an approach may reduce the computational resources required for searching the pre-specified string in the message.

30 Claims, 13 Drawing Sheets

DETERMINING THE PRESENCE OF A PRE-SPECIFIED STRING IN A MESSAGE

This application claims the benefit of priority to Indian Patent Application No. 2002/DEL/2006, filed Sep. 8, 2006.

BACKGROUND

A computer network generally refers to a group of interconnected wired and/or wireless devices such as, for example, laptops, mobile phones, servers, fax machines, and printers. The computer network may support transfer of data, in the form of messages, between the network devices. A network device may determine the presence of one or more pre-specified strings in a message. Such a determination may be preformed, for example, by a security application, a billing application, or other similar applications. A network device may determine the presence of a pre-specified string such as a virus signature in a message based on, for example, a matching rule.

The network devices that determine the presence of pre-specified strings in a message may use, for example, a longest common sequence matching rule. The matching rules such as the longest common sequence matching rule may compare a start byte in the pre-specified string with each byte in the message until a match is found. After a match for the first byte is found the subsequent bytes of the pre-specified string and the message are byte-wise compared to determine a longest common sequence match. However, byte-by-byte comparison techniques may be computationally intensive.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a system and a network device to determine the presence of pre-specified strings in a message. In the following description, numerous specific details such as logic implementations, resource partitioning, or sharing, or duplication implementations, types and inter-relationships of system components, and logic partitioning, or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, and acoustical signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
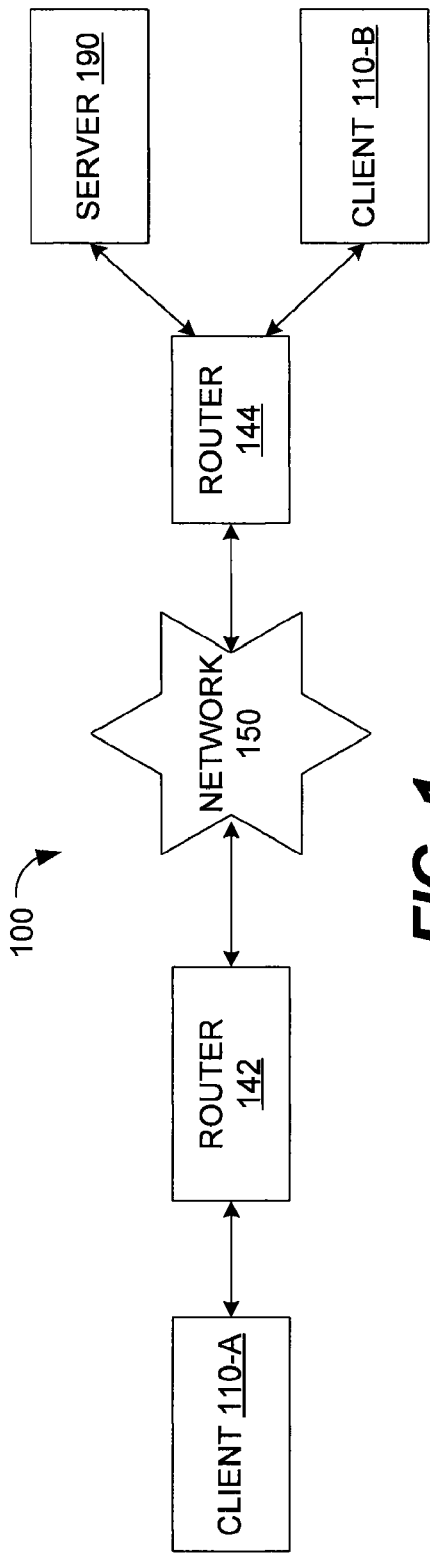
FIG. 1 illustrates an embodiment of a network environment.

An embodiment of a network environment 100 is illustrated in FIG. 1. The network environment 100 may comprise a client 110-A and 110-B, a router 142 and 144, a network 150, and a server 190. For illustration, the network environment 100 is shown comprising a small number of each type of device; however, a typical network environment may comprise a large number of each type of device.

The client 110-A and 110-B may comprise a desktop computer system, a laptop computer system, a personal digital assistant, a mobile phone, or any such computing system. The client 110-A may generate messages and send the messages to the router 142. In one embodiment, the client 110-A may, also, receive messages from the router 142 and may determine the presence of a pre-specified string in the messages by performing a sequence based search. In one embodiment, sequences may represent non-contiguous portions of the message. In one embodiment, the client 110-A may send the message to a corresponding application if the message does not comprise the pre-specified string and may, otherwise, inhibit the message from reaching the application. The client 110-A may be coupled to the router 142 via a local area network (LAN). The client 110 A may, for example, support protocols such as hyper text transfer protocol (HTTP), file transfer protocols (FTP), and TCP/IP.

The server 190 may comprise a computer system capable of sending messages to the router 144 and receiving messages from the router 144. The server 190 may generate a response after receiving a request from the client 110-A. The server 190 may send the response to the client 110-A via the router 144, the network 150, and the router 142. The server 190 may comprise, for example, a web server, a transaction server, or a database server.

The network 150 may comprise one or more network devices such as a switch or a router, which may receive the messages or packets, process the messages, and send the messages to an appropriate network device provisioned in a path to the destination system. The network 150 may enable transfer of messages between the client 110-A and the server 190 and/or the client 110-B. The network devices of the network 150 may be configured to support various protocols such as TCP/IP.

The routers 142 and 144 may enable transfer of messages between the clients 110-A and 110-B and the server 190 via the network 150. In one embodiment, the router 142 may determine the presence of a pre-specified string in the message by performing a sequence based search before sending the message onward. In one embodiment, the router 142 may be configured with one or more pre-specified strings comprising, for example, a set of virus signatures.

Figure 2:
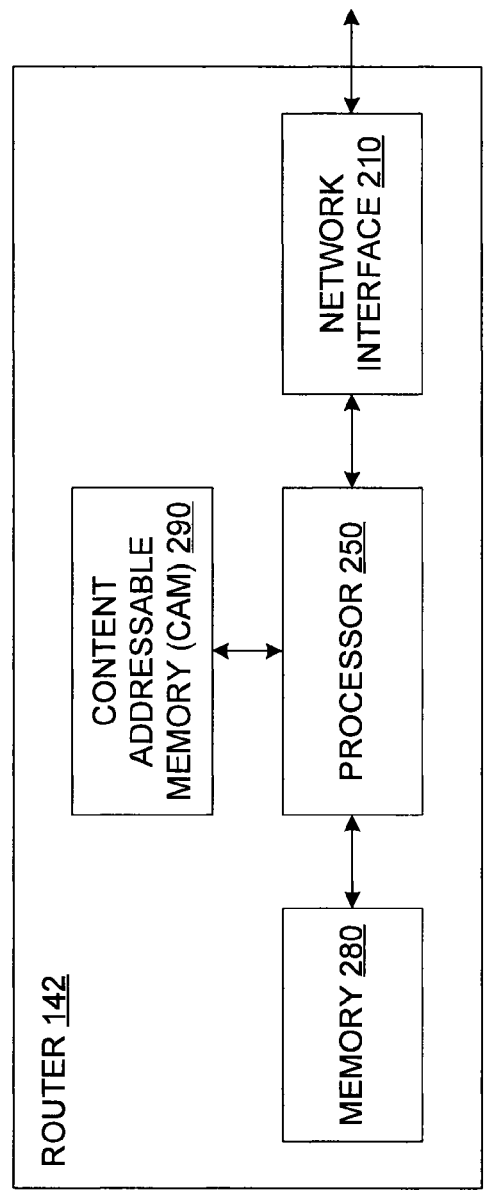
FIG. 2 illustrates an embodiment of a network device of FIG. 1

An embodiment of the router 142 is illustrated in FIG. 2. The router 142 may comprise a network interface 210, a processor 250, a memory 280, and a content addressable memory (CAM) 290. The router 142 may receive one or more messages from the client 110-A and process the message to determine the presence of the pre-specified string. However, embodiments disclosed below may be implemented in other network devices such as the router 144 and the clients 110-A and 110-B or any other network device of the environment 100.

The network interface 210 may transfer one or more messages between the client 110 and the network 150. For example, the network interface 210 may receive a message from the client 110-A and then send the message to the processor 250 for further processing. The network interface 210 may provide physical, electrical, and protocol interfaces to transfer messages between the client 110-A and the network 150.

The memory 280 may store one or more messages and message related information that may be used by the processor 250 to process the packets. In one embodiment, the memory 280 may store messages and CAM tree and/or CAM graph data structures that enable the processor 250 to determine if the pre-specified strings may be present in the message. In one embodiment, the memory 280 may comprise a dynamic random access memory (DRAM) and a static random access memory (SRAM).

The processor 250 may receive one or more messages M from the network interface 210, process the messages, and send the messages to the network interface 210. In one embodiment, the processor 250 may, for example, perform header processing, packet validation, IP lookup, and determine the presence of pre-specified strings in the message by comparing non-contiguous portions of the message M with one or more CAM entries stored in the CAM 290. In one embodiment, the processor 250 may generate the CAM entries from non-contiguous portions of the pre-specified strings whose presence in the message M may be determined. In one embodiment, the processor 250 may comprise, for example, Intel® IXP2400 network processor.

In one embodiment, the CAM 290 may be implemented as a hardware component to quickly process the received messages. In one embodiment, the CAM 290 may receive CAM entries from the processor 250 and store the CAM entries. In one embodiment, the CAM 290 may receive sub-messages or non-contiguous portions of a message M from the processor 250. In one embodiment, the CAM 290 may simultaneously compare a sub-message with one or more CAM entries to quickly determine if any of the CAM entries match the sub-message. The CAM 290 may generate CAM hit information if the sub-message matches the CAM entries. In one embodiment, the CAM hit information may comprise indices of the CAM entries that matched the sub-message, the number of CAM entries that matched the sub-messages, and such other values.

Figure 3:
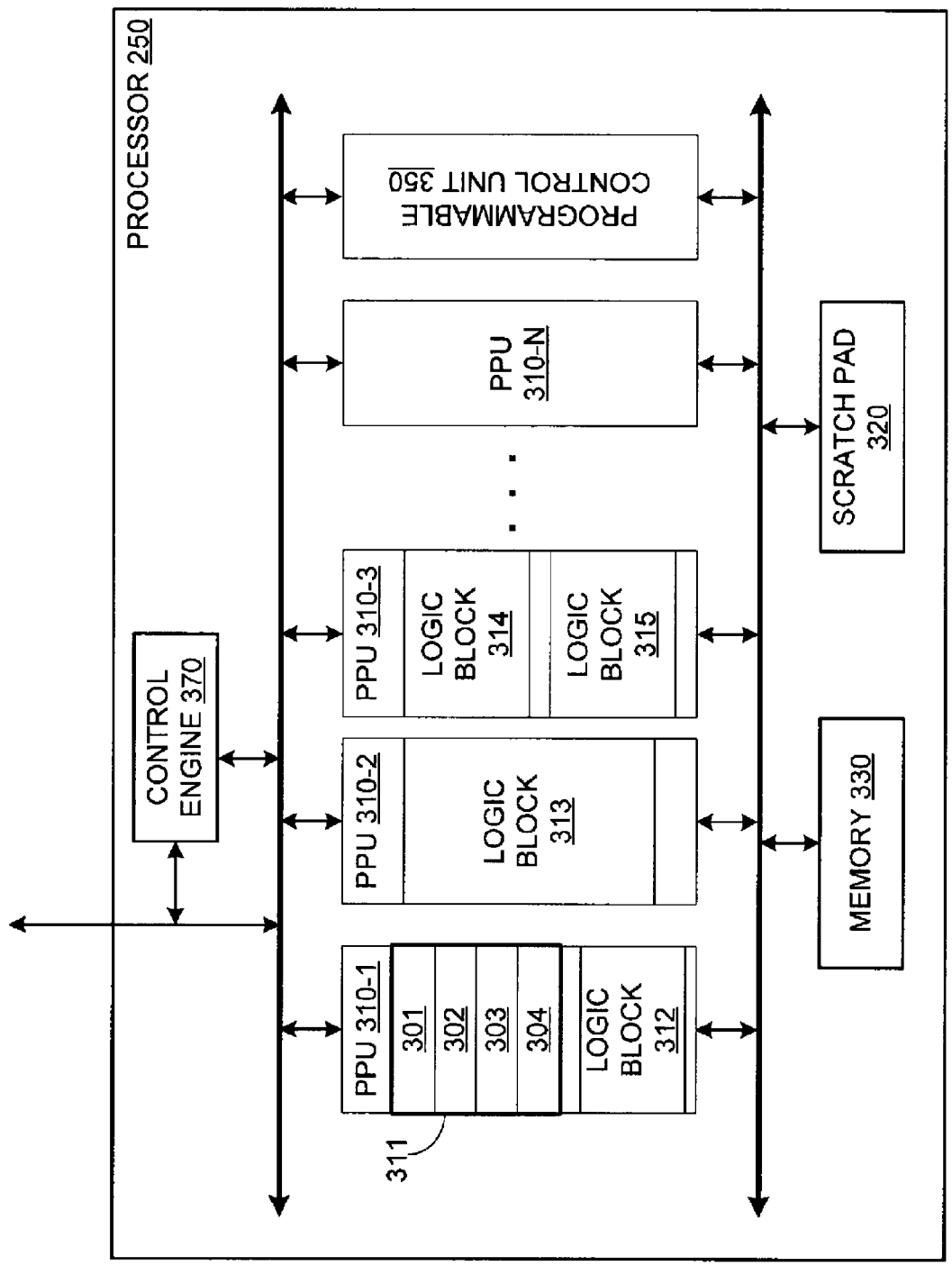
FIG. 3 illustrates an embodiment of a processor of the network device of FIG. 2.

An embodiment of the processor 250 is illustrated in FIG. 3. The processor 250 may comprise programmable processing units (PPU) 310-1 through 310-N, a scratch pad 320, a memory 330, a programmable control unit 350, and a control engine 370.

The memory 330 may store one or more messages and message related information that may be used by the programmable processing units 310-1 through 310-N and the programmable control unit 350 to process the messages. In one embodiment, the memory 330 may store CAM tree and/or CAM graph data structures generated by the programmable control unit 350. In one embodiment, the memory 330 may comprise a dynamic random access memory (DRAM) and a static random access memory (SRAM).

The scratch pad 320 may store, for example, a buffer handler and such other data in a pre-specified memory location that is exchanged between two programmable processing units such as 310-1 and 310-2. In one embodiment, the scratch pad 320 may store, for example, message information corresponding to a message Mx, in a memory location Lxyz, wherein x represents the message identifier, y represents the sinking programmable processing unit, and z represents the sourcing programmable processing unit. For example, a memory location L012 may store message information, which corresponds to a message M0 sunk or written by the programmable processing unit 310-1 and sourced or read by the programmable processing unit 310-2.

The control engine 370 may support the programmable processing units 310-1 through 310-N by updating the control tables. In one embodiment, the control engine 370 may generate a set of pre-specified strings based on configuration values provided by a user. In one embodiment, the control engine 370 may support graphic user interfaces to enable a user such as a network administrator to provide the configuration values. In one embodiment, the control engine 370 may assign one or more sub-processing units of the programmable processing units 310-1 to 310-N to support a logic block, which may perform a sub-task.

The programmable processing units 310-1 through 310-N may co-operatively operate to process the messages. Each programmable processing engine 310-1 through 310-N may comprise one or more sub-processing units. For example, the programmable processing unit 310-1 may comprise sub-processing units such as 301, 302, 303 and 304, which together may support a logic block 311. In one embodiment, the logic blocks supported by the programmable processing units 310-1 through 310-N, together, may be referred to as a regular path. In one embodiment, the programmable processing unit 310-1 may support the logic block 311 and a logic block 312. In one embodiment, the logic block 311 may generate CAM entries based on non-contiguous portions of the pre-specified string and the logic block 312 may store the CAM entries in the content addressable memory (CAM) 290.

In one embodiment, the programmable processing unit 310-2 may support a logic block 313, which may receive a message M0 and generate N sub-messages from the message M0. In one embodiment, the logic block 313 may forward the N sub-messages to the CAM 290 and may receive CAM hit information from the CAM 290. The logic block 313 may check the CAM hit information to determine if the pre-specified string is possibly present in the message M0. The logic block 313 may send the CAM hit information to the programmable control unit 350 if the CAM hit information indicates a possible presence of the pre-specified string in the message M0. Otherwise, the logic block 313 may generate a signal that indicates the absence of the pre-specified string in the message M0.

The programmable control unit 350 may handle protocol messages, configure and update tables and data sets that may be used by the programmable processing units 310-1 to 310-N. In one embodiment, the programmable control unit 350 may, also, support logic blocks, which may, together, be referred to as a specialized path. In one embodiment, higher number of processing cycles may be available to the specialized path compared to processing cycles available for the regular path. In one embodiment, the programmable control unit 350 may generate a CAM tree and/or a CAM graph data structure based on the CAM entries generated by the logic block 311. In one embodiment, the programmable control unit 350 may receive the CAM hit information from the logic block 313 and may determine the presence of the pre-specified string in the message M0 by traversing the CAM tree or the CAM graph data structure.

Figure 4:
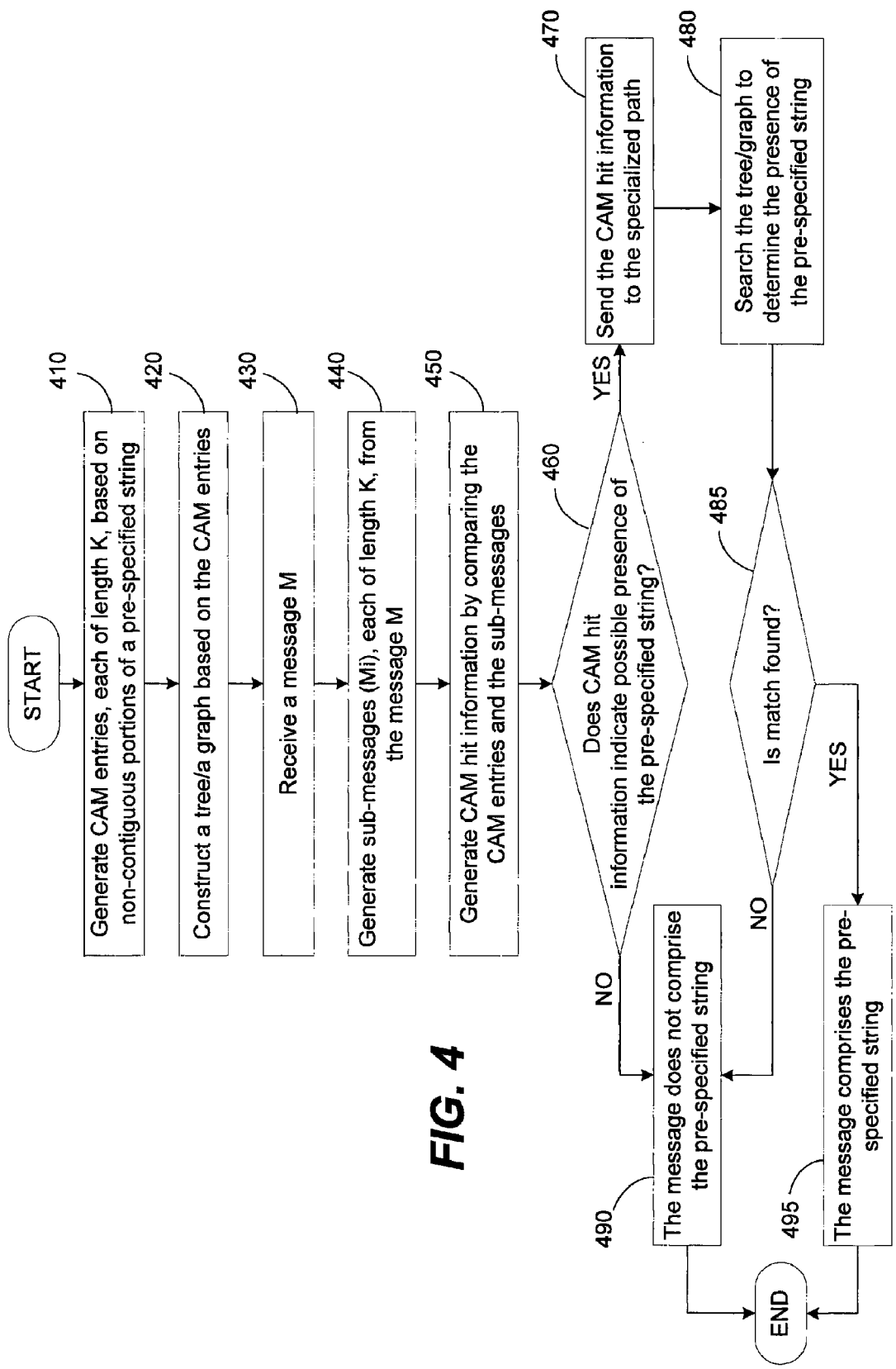
FIG. 4 illustrates an embodiment of the processor, which determines the presence of one or more pre-specified strings in a message.

An embodiment of the processor 250 determining the presence of the pre-specified string in the message M0 is illustrated in FIG. 4. In block 410, the logic block 311 supported by the programmable processing unit 310-1 may generate CAM entries, each of length K, based on the non-contiguous portions of the pre-specified string.

In block 420, the programmable control unit 350 may construct a CAM tree and/or a CAM graph based on the CAM entries generated by the logic block 311.

In block 430, the logic block 313 may receive a message M0. In block 440, the logic block 313 may generate sub-message such as M01, M02, M03 . . . M0$i$, each of length K, from the message M0.

In block 450, the logic block 313 may forward the sub-messages M01, M02, M03 . . . M0$i$ to the CAM 290 and may, in response, receive the CAM hit information.

In block 460, the logic block 313 may determine whether the CAM hit information indicates possible presence of the pre-specified string in the message M0 and control passes to block 470 if the CAM hit information indicates possible presence of the pre-specified string in the message M0 and to block 490 otherwise.

In block 470, the logic block 313 may send the CAM hit information to the specialized path, which may be supported by the programmable control unit 350. In block 480, the programmable control unit 350 may traverse the CAM tree or the CAM graph data structure to determine the presence of the pre-specified string in the message M0.

In block 485, the programmable control unit 350 may check whether a match for the pre-specified string is found and control passes to block 495 if the condition is true and to block 490 otherwise.

In block 490, the logic block 313 may generate a first signal to indicate the absence of the pre-specified string in the message M0. In block 495, the logic block 313 may generate a second signal to indicate the presence of the pre-specified string in the message M0.

Figure 5:
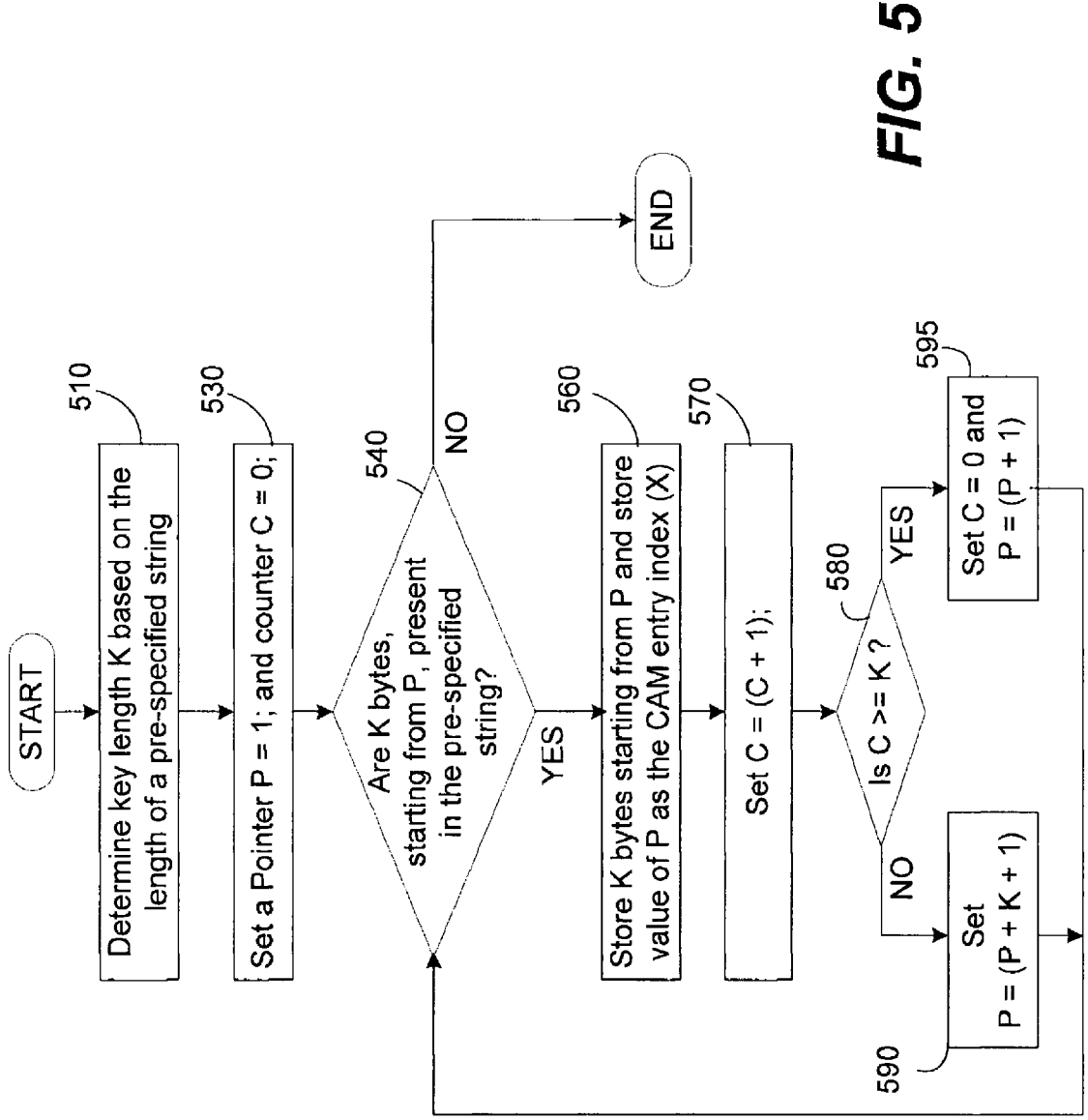
FIG. 5 illustrates an embodiment of the processor generating content addressable memory (CAM) entries from the set of the pre-specified strings.

An embodiment of the processor 250 generating CAM entries based on the pre-specified string is illustrated in FIG. 5. In one embodiment, the logic block 311 may generate a present CAM entry by offsetting the first byte of the present CAM entry by 1 byte from the last byte of the previous CAM entry. In other words, each present CAM entry and a previous CAM entry may be separated by a byte.

In block 510, the logic block 311 may determine key length K based on the length of the pre-specified string. For example, the logic block 311 may determine the key length K=4 for the pre-specified string. In one embodiment, the key length K may be chosen to lie between 3 and 5 if the length of the pre-specified strings varies between 20 and 100 bytes.

In block 530, the logic block 311 may set a pointer P=1; and a counter C=0. In block 540, the logic block 311 may determine if K bytes are present in the pre-specified string. As the pointer P=1 points to the first byte of the pre-specified string, the logic block 311 may check if K bytes are present in the pre-specified string starting from the first byte of the pre-specified string. The logic block 311 may cause control to pass to block 560 if K bytes, starting from the first byte, are present in the pre-specified string and to an end block otherwise.

In block 560, the logic block 311 may store K bytes, starting from the byte pointed by the pointer P and store the value of P as the index of the CAM entry. In one embodiment, the logic block 311 may store K bytes, starting from the first byte of the pre-specified string as a first CAM entry. Also, the logic block 311 may store the value of P (=1) as an index of the first CAM entry. In block 570, the logic block 311 increments the counter by one.

In block 580, the logic block 311 may check if C is greater than or equal to K and control passes to block 590 if the condition is false and to block 595 otherwise. In block 590, the logic block 311 may set P=(P+K+1) and control passes to block 540. In block 595, the logic block 311 may reset the counter C to 0 and may increment P by one and control passes to block 540. The blocks 540, 560, 570, 580, and 590 or 595 may be repeated until the logic block 311 extracts the CAM entries from each pre-specified string of the pre-specified string set.

The logic block 311 may perform the process outlined in flow-chart of FIG. 5 for each pre-specified string. For example, the logic block 311 may generate first set of CAM entries from a first pre-specified string, a second set of CAM entries from a second pre-specified string, and a third set of CAM entries from a third pre-specified string.

Figure 6:
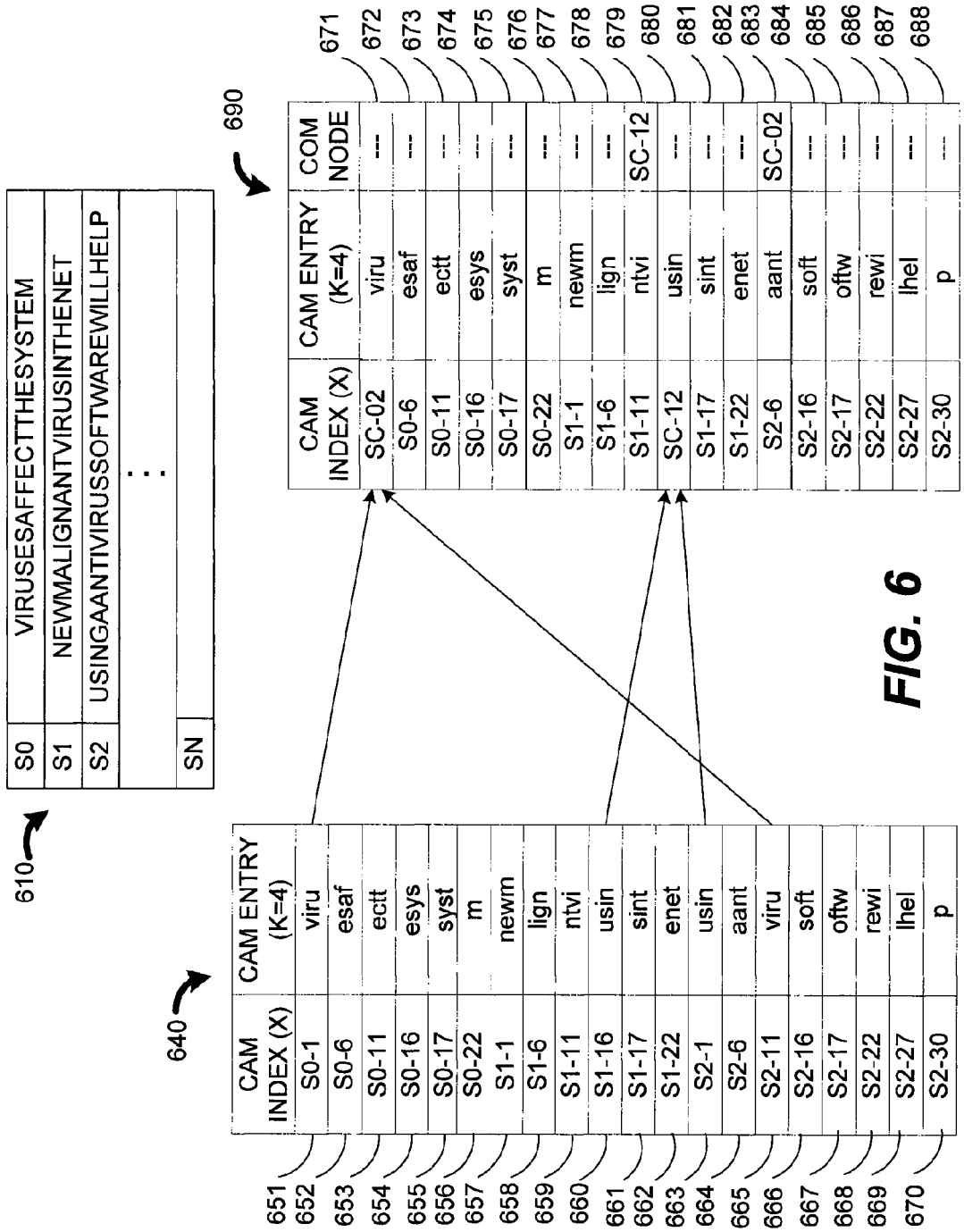
FIG. 6 illustrates an embodiment of a content addressable memory, which may store CAM entries generated by the processor.

An embodiment of the CAM entries generated from each pre-specified string of a set of pre-specified strings is depicted in FIG. 6. A table 610 depicts a list of the pre-specified strings generated or populated by the control engine 370 based on the configuration values provided by the user of the network device such as the router 142. For illustration, a table 610 is shown comprising three pre-specified strings S0, S1, and S2 equaling "virusesaffectthesystem", "newmalignantvirusinthenet", and "usingaantivirussoftwarewillhelp" respectively. In one embodiment, the CAM entries of the pre-specified strings S0, S1, and S2 may equal non-contiguous portions of the pre-specified strings S0-S2.

While generating the CAM entries from the pre-specified substring S0, the logic block 311, as in block 510, may determine the value of K to equal 4. The logic block 311, as in block 530, may set a pointer P=1, which may point to a first byte "v" in the pre-specified string S0. The logic block 311, as in block 540, may check if the pre-specified string S0 comprises K bytes starting from the first byte "v" pointed by the pointer P. As the pre-specified string S0 comprises, at least, 4 bytes starting from the first byte "v", the logic block 311 passes control to block 560. The logic block 311, as in block 560, may generate a first CAM entry equaling "viru", as shown in row 651 of the CAM table 640, by extracting K bytes starting from the first byte "v". The logic block 311 may, also, generate a first index S0-1, as shown in row 651 of the CAM table 640, which corresponds to the first CAM entry "viru". The first index may comprise an identifier (S0) of the pre-specified string S0 and the value of P (=1).

The logic block 311, as in block 570, may increment the counter C by 1. The logic block 311, as in block 580, may check if C (=1) is greater than or equal to K (=4) and control passes to block 590 as the value of C is less than the value of K. The logic block 311, as in block 590, may increment the value of P by P+K+1 (=1+4+1) and as a result, the value of P equals 6. The pointer P may point to $6^{th}$ character "e" in the pre-specified string S0. The logic block 311 may cause control to pass to block 540 and may repeat the blocks 540-590. As a result, the logic block 311 may generate a second CAM entry equaling K bytes from the $6^{th}$ character in the pre-specified string S0. The second CAM entry may thus equal "esaf" and a second index of the second CAM entry "esaf" may equal S0-6 as depicted in row 652 of the table 640.

Similarly, during the next two iterations, the logic block 311 may generate a third and a fourth CAM entry, respectively, equaling "ectt", as shown in row 653, and "esys", as shown in row 654. The logic block 311 may also generate a third and a fourth index, respectively, equaling S0-11 and S0-16. In one embodiment, the S0-11 and S0-16 may, respectively, represent the indices of "ectt" and "esys".

However, during the subsequent iteration, the logic block 311 may perform block 595 after performing block 580 as the value of C (=4) is equal to the value of K (=4). As a result, the logic block 311 may reset the counter C to 0 and increment the pointer P by 1 such that the pointer P equals 17. The logic block 311 may then cause control to pass to block 540 and then to block 560 as the pre-specified string S0 comprises K bytes starting from the $17^{th}$ character "s". The logic block 311 may generate a fifth CAM entry "syst" and a fifth index S0-17 as shown in row 655 of the table 640. Likewise, the logic block 311 may generate a sixth CAM entry "m" with an index equaling S0-22, as shown in row 656 of the table 640.

Figure 11:
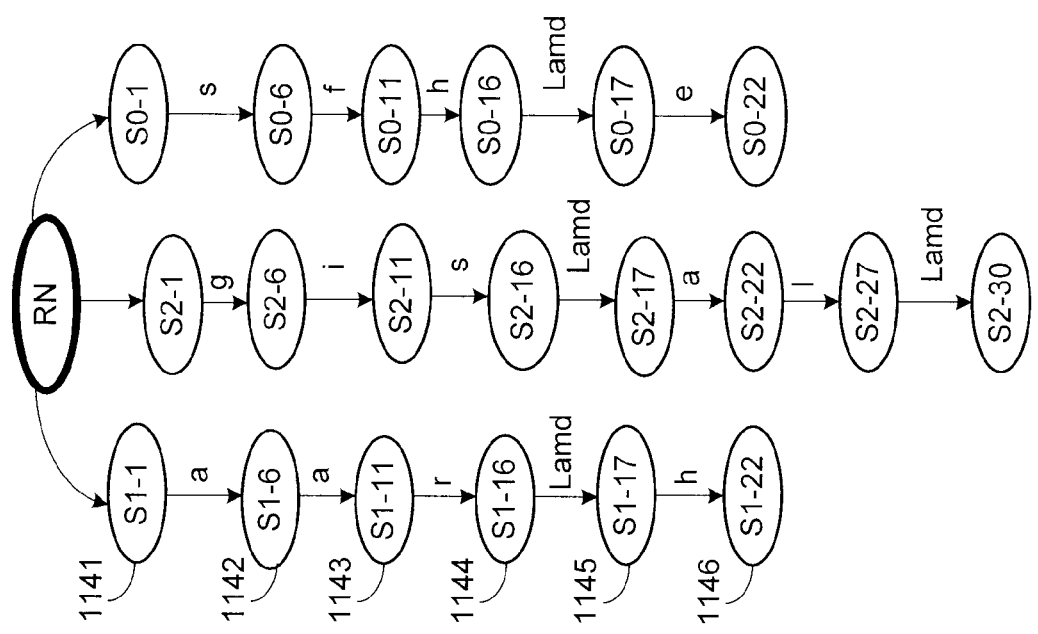
FIG. 11 illustrates a CAM tree generated by the processor.
Figure 13:
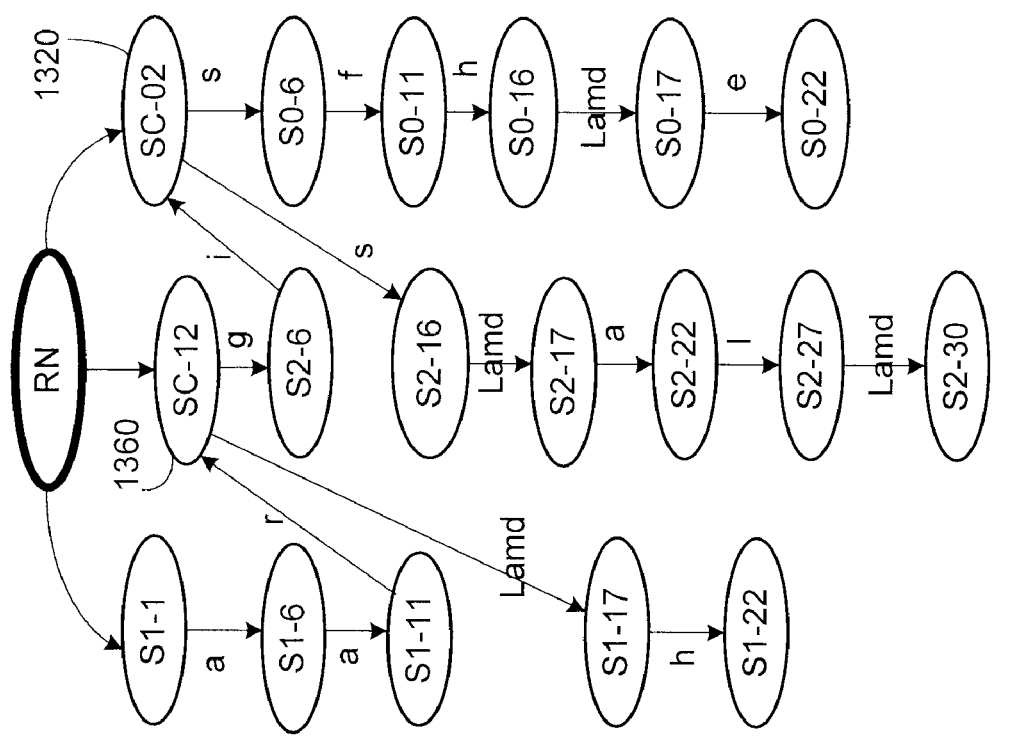
FIG. 13 illustrates a CAM graph generated by the processor.

In one embodiment, the logic block 311 may generate a zeoreth set of CAM entries, as shown in rows 651-656, {viru, esaf, ectt, esys, syst, and m} with indices {S0-1, S0-6, S0-11, S0-16, S0-17, and S0-22}, respectively, for a pre-specified string S0 (=virusesaffectthesystem). Like-wise, the logic block 311 may generate a first set of CAM entries, as shown in rows 657-662, {newm, lign, ntvi, usin, sint, and enet} with indices {S1-1, S1-6, S1-11, S1-16, S1-17, and S1-22}, respectively, for a pre-specified string S1=newmalignantvirusinthenet. The logic block 311 may generate a second set of CAM entries, as shown in rows 663-670, {usin, aant, viru, soft, oftw, rewi, lhel, and p} with indices {S2-1, S2-6, S2-11, S2-16, S2-17, S2-22, S2-27, and S2-30}, respectively, for a pre-specified string S2 (=usingaantivirussoftwarewillhelp). In one embodiment, the programmable control unit 350 may construct a CAM tree as shown in FIGS. 11 and 13 based on the CAM entries, respectively, shown in the table 640 and 690.

An embodiment of an optimized CAM table is depicted in table 690. Table 690 is shown comprising SC-02, viru, and a null value in row 671 and SC-12, usin, and a null value in row 680. In one embodiment, the CAM entry "viru" occurs twice in the CAM table 640 in rows 651 and 665 and the CAM entry "usin" occurs twice in the CAM table 640 in rows 660 and 664. In one embodiment, the logic block 311 may merge the two entries that are equal to generate a merged entry. Such an approach may minimize the size of the CAM 290. In one embodiment, the logic block 311 may merge the CAM entries "viru" in the rows 651 and 665 into a single entry shown in row 671 of the table 690 and CAM entries "usin" in the rows 660 and 664 may be merged into a single entry shown in row 680 of the table 690.

In one embodiment, the logic block 311 may generate merged entries by merging two or more CAM entries that are equal. The index of such merged entries may comprise the identifier of each of the two or more CAM entries. For example, the CAM index SC-02 of the merged entry "viru" represents the CAM entries in row 651 and 665, which is, respectively, generated from the pre-specified strings S0 and S2. Like-wise, the index SC-12 of the merged CAM entry "usin" represents the CAM entries in rows 660 and 664, which is, respectively, generated from the pre-specified strings S1 and S2.

Also, COM NODE column of table 690 may comprise indices of the merged entries associated with the CAM entries that occur prior to the merged entries in the pre-specified string. For example, COM NODE column, in row 683 of the table 690, may comprise SC-02 associated with the CAM entry "aant", which indicates that the entry "aant" precedes the merged entry "viru". In other words, the merged entry "viru" with an index SC-02 occurs after the CAM entry "aant" in the pre-specified string S2. Like-wise, the COM NODE column of row 679 may comprise SC-12, which indicates that the merged entry "usin" with an index SC-12 is the next CAM entry after "ntvi".

Figure 7:
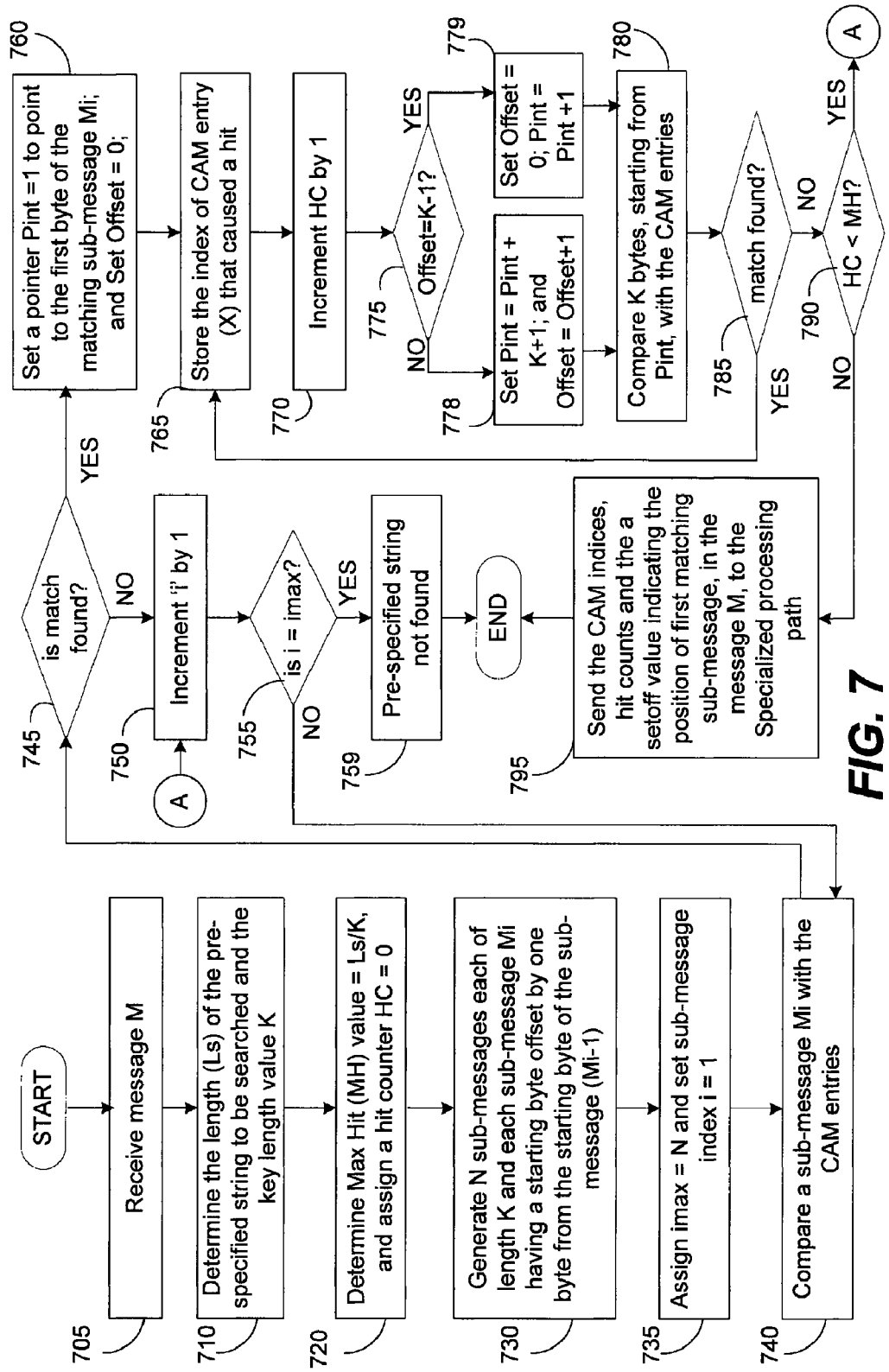
FIG. 7 illustrates an embodiment of the processor determining a possible presence of the pre-specified string in the message M while operating in a regular path.

An embodiment of the processor 250 determining a possible presence of the pre-specified string in the message M0 while operating in the regular path is illustrated in FIG. 7. In block 705, the logic block 313 may receive the message M0. In one embodiment, the message M0 may equal "there are lot of new malignant virus in the net that affect the internet".

In block 710, the logic block 313 may determine the length Ls of the pre-specified string to be searched and the key length K. In one embodiment, the Ls may represent the length of the pre-specified string S0, or S1, or S2 and K represents the length of each sub-message, which may be generated from the message M0. In one embodiment, K may be provided as a configuration value for each pre-specified string S0-S2. For example, the logic block 313 may determine the length of S1 to equal Ls (=25) and the value of K may equal 4 for the pre-specified string S1.

In block 720, the logic block 313 may determine a max hit value MH as equal to Ls/K (=6) and the logic block 313 may, also, initialize a hit counter HC to a zero. In one embodiment, the value of MH may indicate the maximum hits that can occur for a given pre-specified string of length Ls with each CAM entry generated from the pre-specified string equaling K. In one embodiment, the value of K may vary between 3 and 5 for Ls varying between 20 and 100. In one embodiment, the value of K may be selected from a list of K values based on the length of the pre-specified strings. The relation between K and Ls may be, experimentally, determined.

In block 730, the logic block 313 may generate N sub-messages each of length K and each sub-message Mi may start at a byte, which is offset by one byte from the starting byte of the sub-message (Mi−1). In one embodiment, the logic block 313 may generate a set of sub-messages from the message M0. The set of sub-messages may comprise 56 (=N) sub-messages equaling {ther, here, erea, rear, eare, arel, relo, elot, loto, otof, tofn, ofne, fnew, newm, ewma, wmal, mali, alig, lign, igna, gnan, nant, antv, ntvi, tvir, viru, irus, rusi, usin, sint, inth, nthe, then, hene, enet, nett, etth, ttha, that, hata, ataf, taff, affe, ffec, fect, ectt, ctth, tthe, thei, hein, eint, inte, nter, tern, erne, and rnet}.

In block 735, the logic block 313 may assign the value of N to a variable imax and may set a sub-message index i=1. In one embodiment, the sub-message index i=1 may point to a first sub-message "ther"

In block 740, the CAM 290 may compare the sub-message sent by the logic block 313 with the CAM entries. In one embodiment, the CAM 290 may compare the sub-message "ther" indexed by i=1 with the CAM entries shown in table 640. The CAM 290 may send CAM hit information to the logic block 313.

In block 745, the logic block 313 may determine, based on the CAM hit information, if the first sub-message "ther" matches with any of the CAM entries in the table 640. In one embodiment, the CAM 290 may generate CAM hit information comprising the index of the matching CAM entry if the first sub-message matches with at least one of the CAM entries. In one embodiment, the logic block 313 may cause control to pass to block 760 if there exists a match and to block 750 otherwise. In one embodiment, the logic block 313 causes control to pass to block 750 as there is no matching CAM entry present in the table 640 for the first sub-message "ther". The logic block 313 may repeat the blocks 740, 745, 750, and 755 until 'i' reaches imax. The logic block 313 may cause control to pass to block 760, from the block 745, if the CAM hit information comprises data indicating a match between a sub-message and a CAM entry.

In block 750, the logic block 313 may increment the value of 'i' by 1. In one embodiment, incrementing the value of 'i' may cause the index i (=2) to point to a second sub-message "here".

In block 755, the logic block 313 may check whether the value of index i is equal to imax and control passes to block 740 if index "i" is less than "imax" and to block 759 otherwise. As the value of "i (=2)" is less than "imax (=56)", control passes to block 740. In block 759, the logic block 313 may generate a signal to indicate the absence of the pre-specified string in the message M0.

In block 760, the logic block 313 may set a pointer Pint=1 to point to first byte of the matching sub-message Mj and may, also, set a variable offset to zero. In one embodiment, the block 760 is reached if a sub-message Mj matches with a CAM entry depicted in the table 640.

In block 765, the logic block 313 may store the index of the first matching CAM entry in the memory 330. In block 770, the logic block 313 may increment the value of the HC counter by 1. As a result, the HC equals one. In block 775, the logic block 313 may check if the offset equals K−1 and control passes to block 778 if the offset is not equal to K−1 and to block 779 if the offset equals K−1. As the offset (=0) is less than K−1 (=3), control passes to block 778.

In block 778, the logic block 313 may set the pointer Pint to (Pint+K+1) and increment the offset by 1. As a result, the pointer Pint equals 6 and the offset equals 1.

In block 779, the logic block 313 may reset the offset to zero and may increment the Pint by 1. In block 780, the CAM 290 may compare K bytes, starting from Pint (=6), with the CAM entries.

In block 785, the logic block 313 may check whether a match is found and control passes to block 765 if the condition is true and to block 790 otherwise.

For example, the CAM 290, as in block 740, may compare a sub-message Mj equaling "newm" with the CAM entries of the table 640. The CAM 290 may determine a match for the sub-message "newm" as the table 640 comprises a CAM entry "newm" with an index S1-1 at row 657. Thus, "newm" may be referred to as a first matching sub-message. As a result, the block 760 is reached. The logic block 313, as in block 760, may set the pointer Pint to 1, which points to the first byte "n" and the offset to zero as the first byte "n" of the first matching sub-message "newm" is at an offset of zero from the first byte "n". The logic block 313, as in block 765, may store the index S1-1 of "newm" in the memory 330.

The logic block 313, as in block 770 may set the HC to one and compare the offset with K−1 as in block 775 and cause control to reach the block 778. The logic block 313, as in block 778, may set the Pint (=6) to point to '1', which the first byte of the sub-message "lign". The CAM 290, as in block 780, may compare 4 bytes "lign" with the CAM entries in the table 640. The sub-message "lign" matches with the CAM entry "lign" in the row 658. Thus, "lign" may be referred to as a second matching sub-message. The logic block 313 may cause control to pass to block 765, in which the logic block 313 may store the index S1-6 of the CAM entry "lign".

The logic block 313 may repeat the blocks 765, 770, 775, 778, 780, and 785 until a match is not found. As a result, the logic block 313 and the CAM 290 together may determine a match for the sub-messages "ntvi" and "usin", which may be, respectively, referred to a third and fourth matching sub-message. The index S1-11 of the CAM entry "ntvi" in row 659 of the table 640 and the index S1-16 of the CAM entry "usin" in row 660 of the table 640 may be stored in the memory 330.

However, during the subsequent iteration, the logic block 313 passes control to block 779 as the offset (=3) equals K−1 (=3). As a result, the logic block 313, as in block 779, may increment the pointer Pint, which may point to the seventeenth byte equaling "s" and the offset may be reset to zero. The CAM 290, as in block 780, may compare K bytes "sint" starting from the byte "s" pointed by the pointer Pint and may generate CAM hit information. The logic block 313 may, as in block 785, determine, based on the CAM hit information, if a match for "sint" is found. As the match is found, the logic block 313 may cause control to pass to block 785, in which the logic block 313 may store the index S1-17 in the memory 330. Thus, "sint", may be referred to as a fifth matching sub-message. Like-wise, the CAM 290 may determine a match between a sub-message "enet" and the CAM entry "enet" in row 662 of the table 640. The logic block 313 may store the index S1-22 in the memory 330. During the subsequent iteration, the CAM 290 may not find a match for "haht" and as a result, control passes to block 790.

In block 790, the logic block 313 may check if hit count HC is less than maximum hit MH and control passes to block 750 if the condition is true and to block 795 otherwise.

In block 795, the logic block 313 may send the CAM indices; hit count value stored in the counter HC, and a setoff value indicating the position of the first byte of the first matching sub-message, in the message M, to the specialized path. In one embodiment, the logic block 313 may send the CAM indices equaling {S1-1, S1-6, S1-11, S1-16, S1-17, and S1-22}, HC (=6), and the value of "i" (=14) to the specialized path.

The first, second, third, fourth, fifth, and the sixth matching strings equal "newm", lign, "ntvi", "usin", and "sint", respectively, which represent non-contiguous portions of the message M0, the computational resources required may be lesser as compared to a computational resources required to perform byte-by-byte comparison. Also, as the logic block 313 generates each sub-message offset by a byte, the start byte "n" of the first matching sub-message "newm" may be unambiguously determined.

Figure 8:
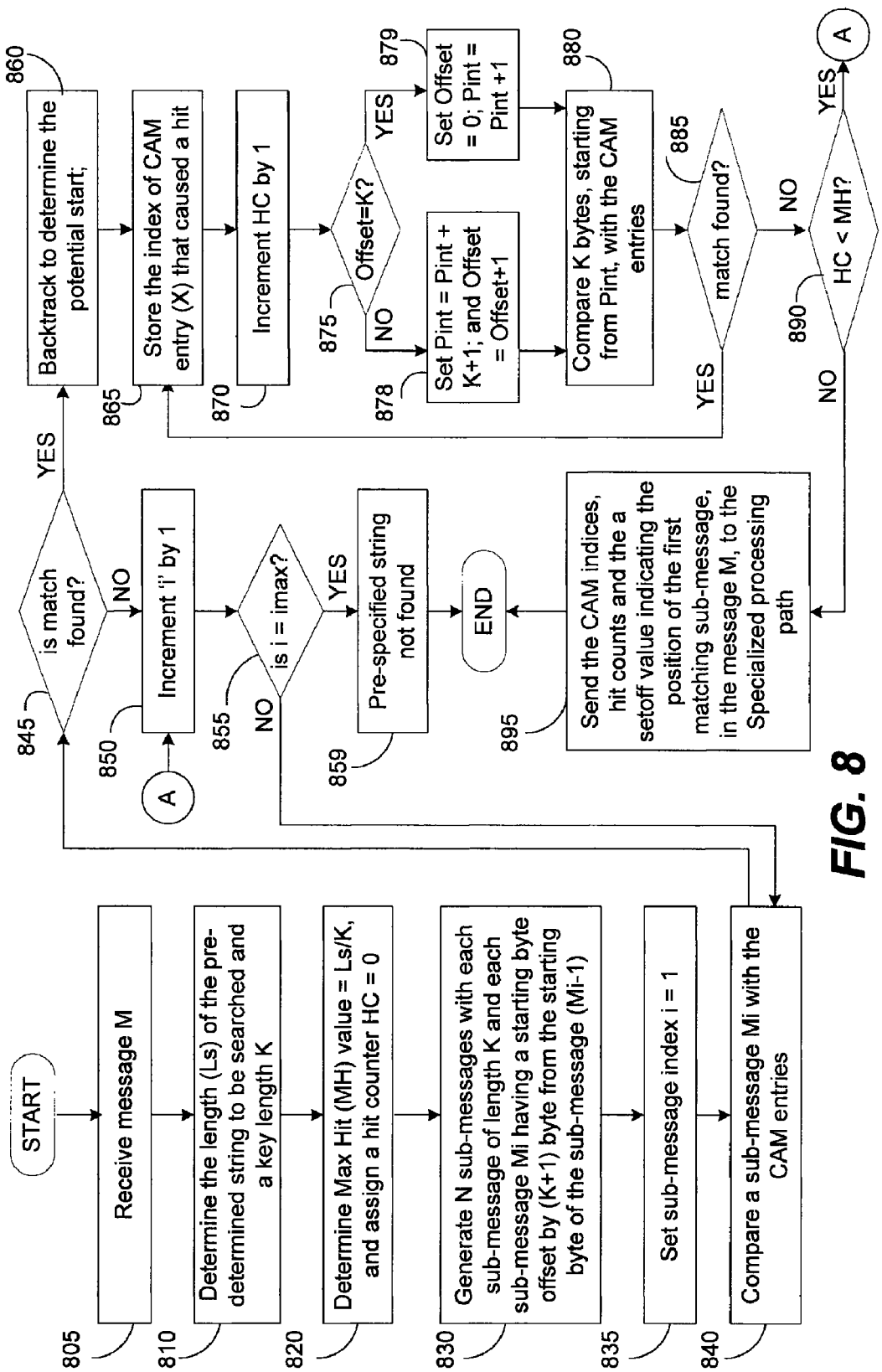
FIG. 8 illustrates an embodiment of the processor determining, optimally, a possible presence of the pre-specified string in the message M while operating in the regular path.

An embodiment of the processor 250, which may optimally determine a possible presence of the pre-specified string in the message M while operating in the regular path is illustrated in FIG. 8. In one embodiment, the processor 250 may optimize the computational resources by matching the sub-messages offset by K bytes, starting from the first byte of the sub-message, compared to matching each sub-message offset by a byte. However, the processor 250 may not determine the start byte of the first matching sub-message unambiguously. As a result, the processor 250 may backtrack to determine the start byte of the first matching sub-message after determining a first match. For conciseness, only the differences between the FIG. 7 and the FIG. 8 are described. The blocks 805, 810, 820, 835, 840, 845, 850, 855, 859, 865, 870, 875, 878, 879, 880, 885, 890, 895 of FIG. 8 are similar to blocks 705, 710, 720, 735, 740, 745, 750, 755, 759, 765, 770, 775, 778, 779, 780, 785, 790, 795 of FIG. 7.

In block 830, the logic block 313 may generate N sub-messages with each sub-message of length K and each sub-message Mi having a starting bytes offset by K+1 bytes from the starting byte of the sub-message M(i−1). As a result, the logic block 313 may generate sub-messages equaling {ther, eare, loto, fnew, mali gnan, tvir, usin, then, etth, ataf, fect, thei, nter, and net}. The value of N=15 compared to N=56 generated in block 730 of FIG. 7. It may be noted that the sub-messages does not comprise "newm", which is the first matching sub-message as described in FIG. 7. The logic block 313, as in block 845, may determine the first matching sub-message as "usin". In block 860, the logic block 313 may backtrack to determine the potential start of the first matching sub-message. In one embodiment, the potential start of the pre-specified string S1 equals "n", which is at the 14$^{th}$ byte position.

Figure 9:
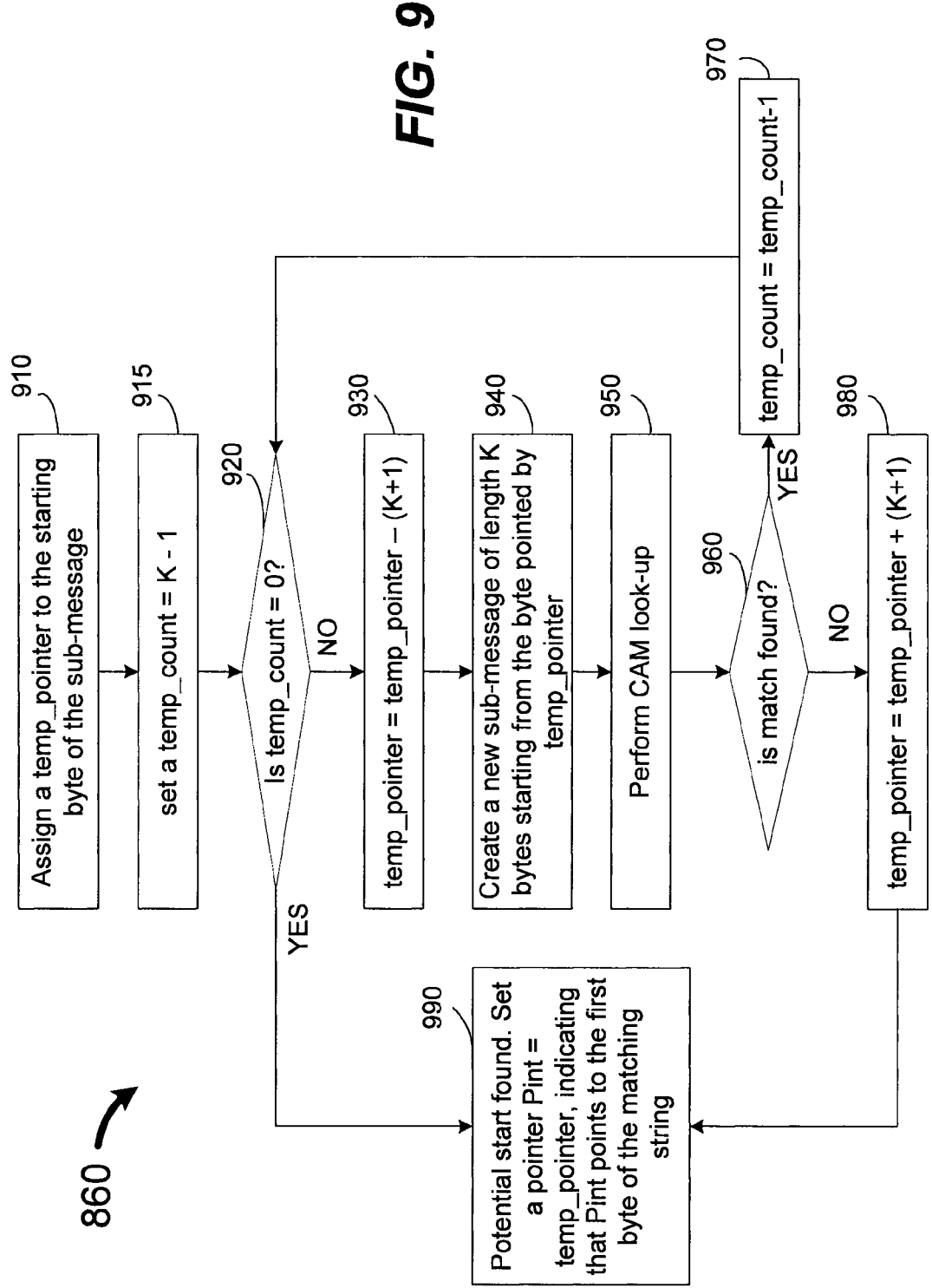
FIG. 9 illustrates an embodiment of the processor backtracking the contents of the message M to determine a potential start point of a first matching sub-message.

An embodiment of the processor 250 backtracking to determine the potential start of the first matching sub-message is illustrated in FIG. 9. In one embodiment, the blocks 910-990 describe the backtracking indicated in block 860 of the FIG. 8.

In block 910, the logic block 313 may assign a temp_pointer to the starting of the matching sub-message. In one embodiment, the logic block 313 may assign a temp-pointer to the starting byte "u" of the matching sub-message "usin" determined in blocks 840 and 845 of FIG. 8. The logic bloc 313 may assign a position value 29 of "u" to the temp_pointer. The character "u" is 29$^{th}$ byte in the message M "there are lot of new malignant virus in the net that affect the internet".

In block 915, the logic block 313 may set a temp_count to K−1 (=3). In block 920, the logic block 313 may check if the temp_count equals 0 and control passes to block 990 if the condition is true and to block 930 otherwise.

In block 930, the logic block 313 may decrement the temp_pointer by (K+1). In the above example, the logic block 313 may decrement the temp_pointer by 5 (=4+1) during a first back track iteration and as a result, the temp_pointer points to a byte "n", which is at 24$^{th}$ position in the message M0.

In block 940, the logic block 313 may create a new sub-message of length K bytes starting from the byte pointed by the temp_pointer. In the above example, the logic block 313 may generate a sub-message "ntvi" of length K bytes starting from the byte "n" pointed by the temp_pointer.

In block 950, the CAM 290 may perform a CAM look-up to generate CAM hit information. In one embodiment, the CAM 290 may compare "ntvi" with the CAM entries in the CAM table 940. In block 960, the logic block 313 may check, based on CAM hit information, if a match is found and control passes to block 970 if the match is found and to block 980 otherwise. The logic block 313 may cause control to pass to block 970.

In block 970, the logic block 313 may decrement the temp_count by 1 and control passes to block 920. During the second backtrack iteration, the logic block 313 may reach the block 930 as the temp_count is not equal to zero and the temp_pointer may be decremented, as in block 930, to point to a byte "l", which is at 19$^{th}$ position of the message M0. The logic block 313 may create, as in block 940, a sub-message equaling "lign" starting from the byte "l" pointed by the temp_pointer. The CAM 290 may perform a look-up, as in block 950, to determine if a match is found for the sub-message "lign" and based on the CAM hit information, the logic block 313 may cause, as in block 960, control to pass to block 970 and then to block 920.

During the third backtrack iteration, the logic block 313 may reach the block 930 as the temp_count, as compared in block 920, is not equal to zero and the temp_pointer may be decremented, as in block 930, to point to a byte "n", which is at 14$^{th}$ position of the message M0. The logic block 313 may create, as in block 940, a sub-message equaling "newm" starting from the byte "n" pointed by the temp_pointer. The CAM 290 may perform a look-up, as in block 950, to determine if a match is found for the sub-message "newm" and based on the CAM hit information, the logic block 313 may cause, as in block 960, control to pass to block 970 and then to block 920. In one embodiment, the sub-message "newm" may be referred to as a last matching sub-message. During the fourth backtrack iteration, the logic block 313 may reach the block 990 as the temp_count is equal to zero.

In block 980, the logic block 313 may increment the temp_pointer by (K+1) and control passes to block 990. In block 990, the logic block 313 may set the pointer Pint to equal temp_pointer, which indicates that the pointer Pint points to the first byte of the last matching string "newm". In the above example, the pointer Pint may be set equal to the temp_pointer, which is equal to 14. The pointer Pint may now point to the first byte of the last matching sub-message "newm". The logic block 313 may then continue with the block 865 of the FIG. 8.

Figure 10:
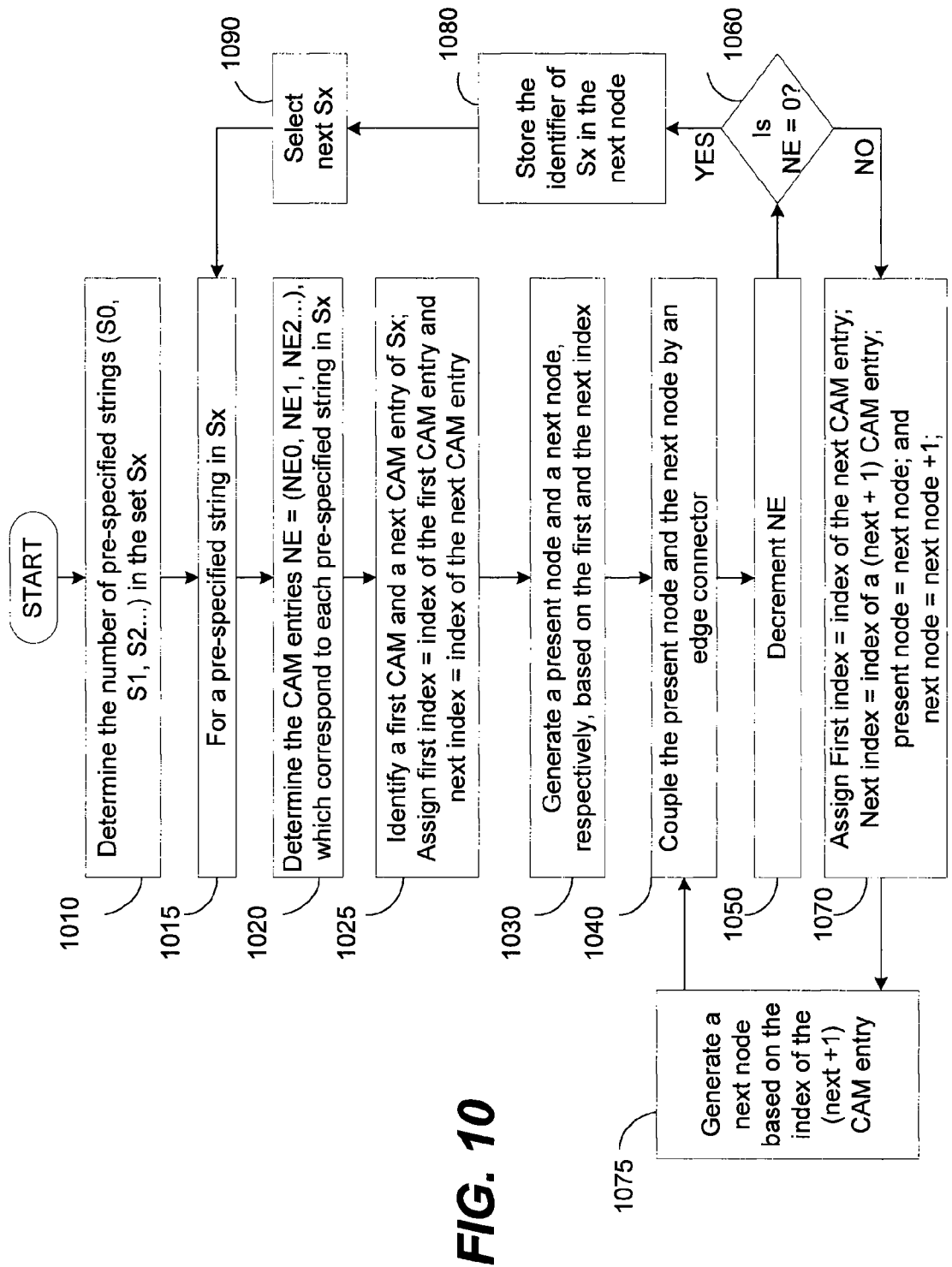
FIG. 10 illustrates an embodiment of the processor generating a CAM tree.

An embodiment of the processor 250 generating the CAM tree of FIG. 11 is illustrated in FIG. 10. In block 1010, the programmable control unit 350 may determine the number of pre-specified strings (S0, S1, S2 . . . ) in the set Sx. For example, the set Sx may comprise 3 pre-specified strings S0, S1, and S2 as depicted in the table 610.

In block 1015, the programmable control unit 350 may select one of the pre-specified strings and may perform the blocks 1020-1090 for the selected string. For example, the programmable control unit 350 may select the pre-specified string S1.

In block 1020, the programmable control unit 350 may determine the CAM entries NE=(NE0, NE1, NE2 . . . ), which correspond to each pre-specified string in Sx. For example, the number of CAM entries NE1, which corresponds to the pre-specified string S1, may equal 6. Like-wise, the number of CAM entries NE0 and NE2 of the pre-specified strings S0 and S2 may respectively equal 6 and 8.

In block 1025, the programmable control unit 350 may identify a first CAM entry and a next CAM entry of the selected pre-specified string and assign an index of the first CAM entry to a variable first index and an index of the next CAM entry to a variable next index. For example, the programmable control unit 350 may identify "newm" and "lign" of the pre-specified string S1, respectively, as the first CAM entry and the next CAM entry. The programmable control unit 350 may assign S1-1 and S1-6, respectively, to the variables first index and the next index.

In block 1030, the programmable control unit 350 may generate a present node and a next node, respectively, based on the first index and the next index. For example, the programmable control unit 350 may generate the present node 1141 and assign the first index S1-1 to the present node 1141 as depicted in FIG. 11. The programmable processing unit 350 may then generate the next node 1142 and assign the next index S1-6 to the next node 1142 as depicted in FIG. 11.

In block 1040, the programmable control unit 350 may couple the present node and the next node by an edge connector. In one embodiment, the edge connector may refer to a character, which corresponds to the offset byte between the two adjacent CAM entries. For example, the CAM entries "newm" and "lign" are offset by a byte equaling "a". The character "a" is referred to as the edge connector. The present node 1141 and the next node 1142 may be coupled by an edge connector "a" as depicted in FIG. 11. However, the edge connector may equal a constant "lamd", if the two adjacent CAM entries are offset by 0 bytes.

In block 1050, the programmable control unit 350 may decrement the value of NE. In the above example, the programmable control unit 350 may decrement the value of NE1 by 1 and as a result, the value of NE1 may equal 5.

In block 1060, the programmable control unit 350 may check if NE equals 0 and control passes to block 1070 if NE is not equal to 0 and to block 1080 otherwise. In the above example, control passes to block 1070 as the value of NE1 (=5) is not equal to 0.

In block 1070, the programmable control unit 350 may assign the index of the next CAM entry to the first index and the index of the (next+1) CAM entry to the next index. Also, the programmable control unit 350 may assign the next node to the present node and the (next node+1) node to the next node. In the above example, the S1-6 may be assigned to the first index and S1-11 may be assigned to the next index. As a result, the next node 1142 becomes a present node and the (next node+1) node 1143 becomes the next node.

In block 1075, the programmable control unit 350 may generate the next node based on the index of the (next+1) CAM entry and control then passes to block 1040. In the above example, the next node may be assigned an index value S1-11 of the (next+i) CAM entry "ntvi". Likewise, the programmable control unit 350 may generate nodes 1144, 1145, and 1146, respectively, assigned with the indices S1-16, S1-17, S1-22 as depicted in FIG. 11. The nodes 1142 and 1143 may be coupled by an edge connector "a" as depicted in the FIG. 11. Likewise, the programmable control unit 350 may couple nodes (1143, 1144) by an edge connector "r", nodes (1144, 1145) by an edge connector "lamd", and nodes (1145, 1146) by an edge connector "h" as depicted in FIG. 11.

In block 1080, the programmable control unit 350 may store the identifier of the pre-specified string Sx in the next node, which is the last node of the segment of the CAM tree that corresponds to the pre-specified S1. In block 1090, the programmable control unit 350 may select another string and control passes to block 1015.

The CAM tree of FIG. 11 may comprise one or more branches with each branch representing a pre-specified string in the set Sx. The CAM tree of FIG. 11 is shown comprising a first, a second, and a third branch representing strings S0, S1, and S2 respectively. In one embodiment, the first branch, the second branch, and the third branch may comprise first nodes, second nodes, and third nodes respectively. The CAM tree data structure may consume less memory as each node comprises indices of length equaling one or two bytes. For example, the second nodes 1141 to 1146 may comprise indices S1-1 to S1-22, the first nodes may comprise indices S0-1 to S0-22, and the third nodes may comprise indices S2-1 to S2-30. As a result of using one or two bytes to represent the indices of the nodes, the memory consumed by the CAM tree data structure may be minimized. In one embodiment, the nodes of the CAM graph may be implemented using data structures such as the linked list.

Figure 12:
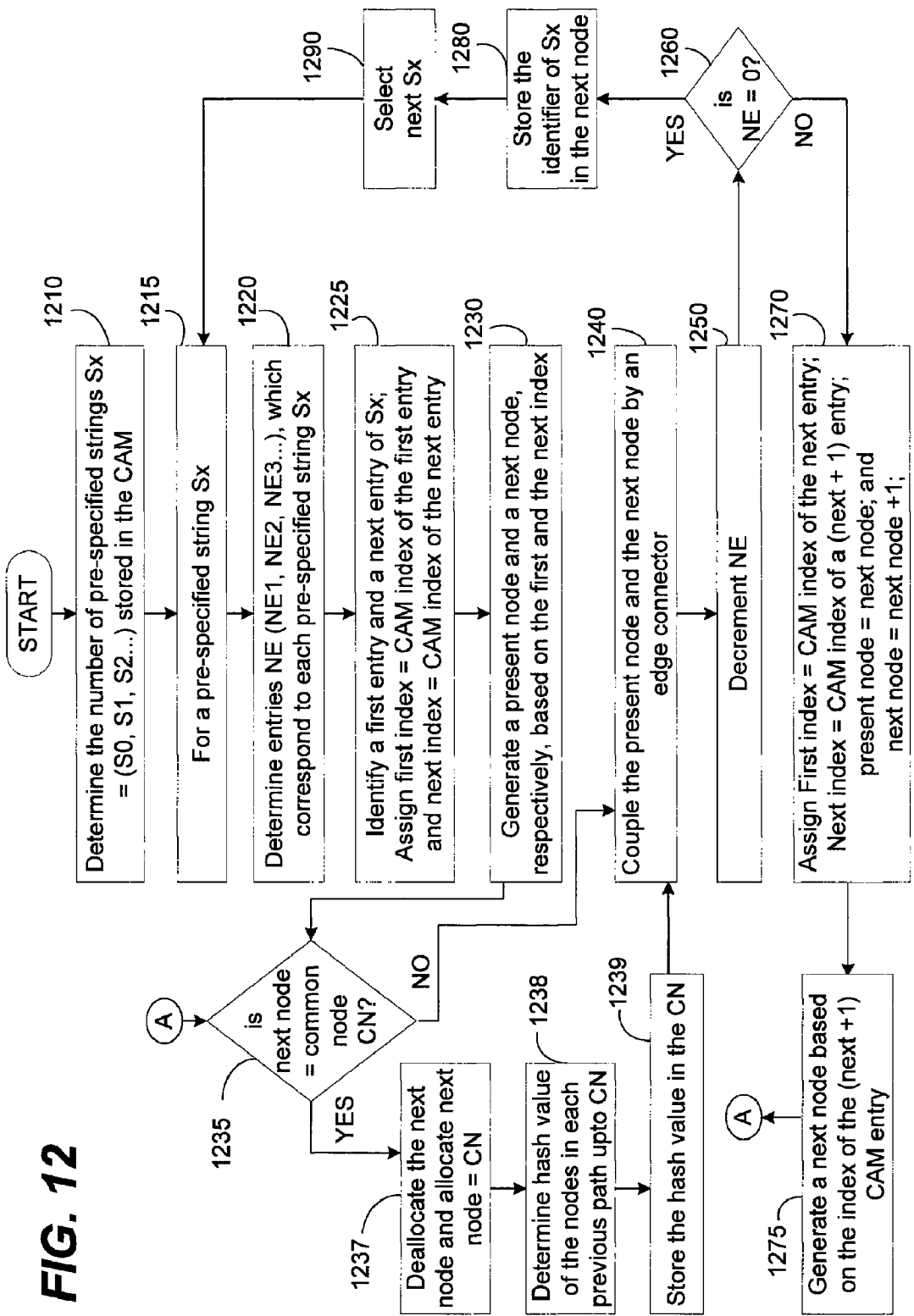
FIG. 12 illustrates an embodiment of the processor generating a CAM graph.

An embodiment of the processor 250 generating the CAM graph of FIG. 13 is illustrated in FIG. 12. In one embodiment, the programmable control unit 350 generates a common node to represent two or more entries, which are identical. In one embodiment, the CAM graph of FIG. 13 depicts two nodes 1320 and 1360, which represent the two merged entries "viru" and "usin". In one embodiment, the CAM entries "viru" generated from the pre-specified string S0 and S2 may be merged into a single entry represented by the common node 1320 with an index SC-02. Also, the CAM entries "usin" generated from the pre-specified strings S1 and S2 may be merged into a single entry represented by the common node 1360 with an index SC-12.

For conciseness, only the differences between the FIGS. 10 and 12 are described. The blocks 1210, 1215, 1220, 1225, 1230, 1240, 1250, 1260, 1270, 1275, 1280, and 1290 are identical to the blocks 1010, 1015, 1020, 1025, 1030, 1040, 1050, 1060, 1070, 1075, 1080, and 1090. In one embodiment, the programmable control unit 350 may perform additional operations, after generating a present node and a next node, if the next node is a common node.

In one embodiment, after generating the present node and the next node in block 1230, the programmable control unit 350 may cause control to pass to block 1235. Also, the block 1235 may be reached from block 1275. In block 1235, the programmable control unit 350 may check if the next node is a common node and control passes to 1240 if the next node is not a common node and to block 1237 if the next node is a common node.

In block 1237, the programmable control unit 350 may de-allocate the next node and may allocate the common node to the next node. In one embodiment, the programmable control unit 350 may, for example, de-allocate the next node equaling S1-16 and may then allocate the common node 1360 comprising a CAM index SC-12 as the next node.

In block 1238, the programmable control unit 350 may determine the hash value of the nodes in each previous path up to the common node. In one embodiment, the programmable control unit 350 may determine a first hash value of all the nodes, in a first path starting from a root node RN, comprising indices S1-1, S1-6, S1-11, and SC-12. The programmable control unit 350 may determine a second hash value of the node, in a second path starting from the root node RN, comprising the index SC-12. In one embodiment, the hash values may be computed to maintain the history of the nodes that may be traversed before reaching a common node 1360 of FIG. 13.

In one embodiment, the first hash value may be different form the second hash value. Likewise, for the common node 1320 of FIG. 13, the programmable control unit 350 may determine a third hash value of all the nodes, in a third path, comprising indices SC-12, S2-6 and SC-02 and a fourth hash value of the node, in a fourth path, comprising the index SC-02. In one embodiment, the hash values may be computed based on the addresses of the nodes in each path. Such an approach may reduce the possibility of hash values of two or more paths being identical.

In block 1239, the programmable control unit 350 may store the hash values in the common nodes 1320 and 1360 of FIG. 13. In one embodiment, the programmable control unit 350 may receive CAM hit information from the regular path and may unambiguously identify the path prior to the common node if the CAM hit information comprises an index of the common node.

The CAM graph of FIG. 13 may comprise one or more branches with each branch representing a pre-specified string in the set Sx. In one embodiment, the nodes of the CAM graph may be implemented using data structures such as the linked list. The CAM graph of FIG. 13 is shown comprising a first, a second, and a third branch representing strings S0, S1, and S2 respectively. In one embodiment, the first branch, the second branch, and the third branch may comprise first nodes, second nodes, and third nodes respectively. In one embodiment, the CAM graph may comprise nodes, which may represent a CAM entries such as "viru", which is common to the pre-specified strings S0 and S2 and "usin", which is common to the pre-specified strings S1 and S2. As each branch of the CAM graph represents a pre-specified string, a single common node may be used to represent two or more CAM entries that are equal. The CAM graph data structure may consume less memory as each of the common CAM entries such as "viru" and "usin" may be represented by a single node. In one embodiment, the indices stored in each node may be one or two byte long. As a result, the memory consumed by the CAM graph may be optimized.

Figure 14:
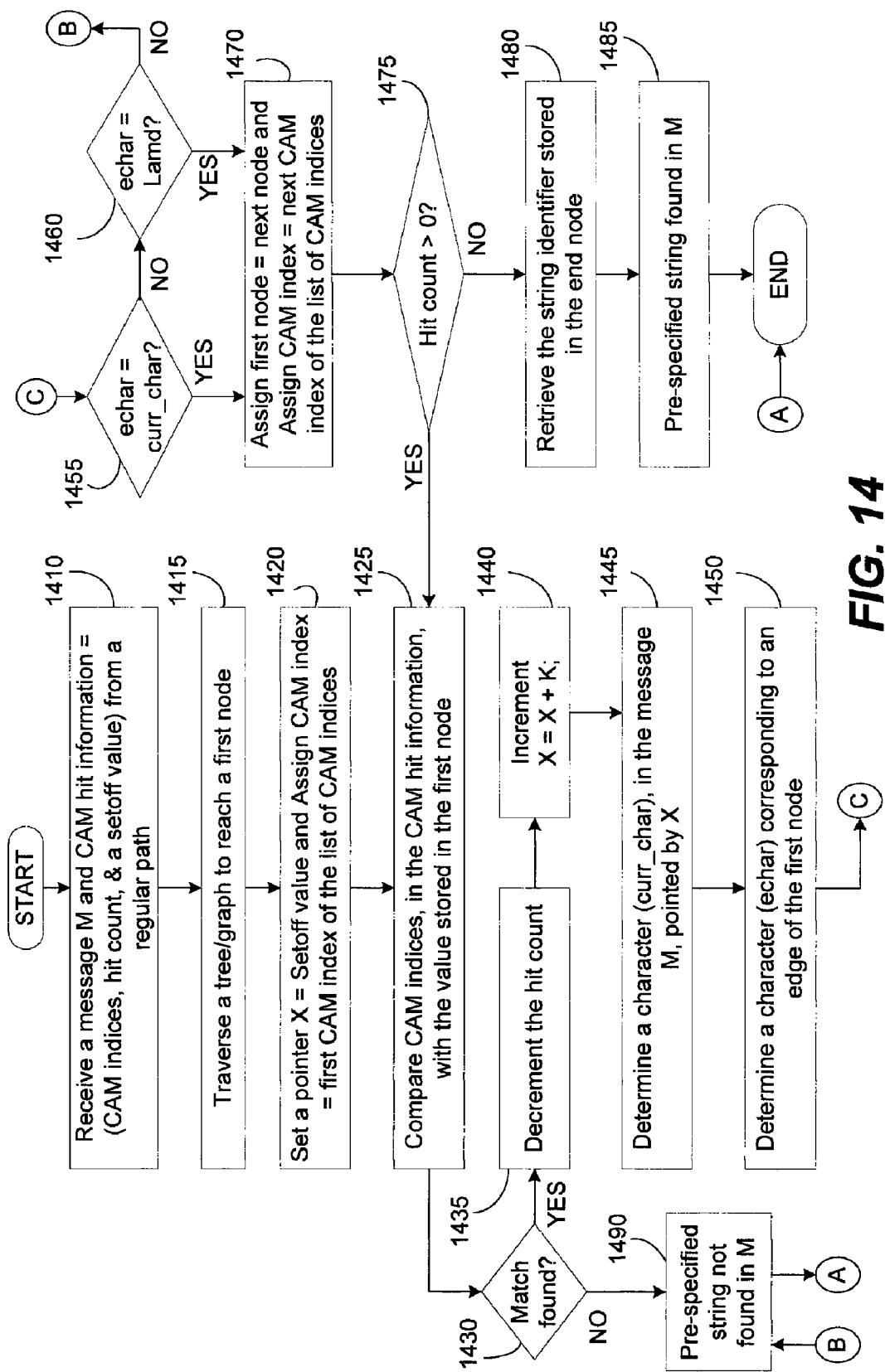
FIG. 14 illustrates an embodiment of the processor determining the presence of the pre-specified string in the message M while operating in a specialized path.

An embodiment of the processor 250 determining the presence of the pre-specified string in the message M while operating in a specialized path is illustrated in FIG. 14. In block 1410, the programmable control unit 350 may receive, from the regular path, a message M and CAM hit information comprising, for example, the indices of the CAM entries that matched one or more sub-messages of the message M, the hit count (HC), and the setoff value (i) determined in FIG. 7.

In block 1415, the programmable control unit 350 may traverse the CAM tree or the CAM graph depicted, respectively, in FIG. 11 and FIG. 13 to reach the first node.

In block 1420, the programmable control unit 350 may assign the setoff value to a pointer X and a first CAM index of the list of CAM indices to the CAM index. In one embodiment, the value of "i" may be assigned to the pointer X. The value of "i" may equal 14 as the position of the first byte "n" of the first matching sub-message "newm", in the message M, equals 14. The programmable control unit 350 may assign the index S1-1 of the first matching sub-message "newm" to the variable CAM index.

In block 1425, the programmable control unit 350 may compare the indices, in the CAM hit information, with the index of the first node. In one embodiment, the indices in the CAM hit information, received from the regular path, may comprise {(S1-1, S1-6, S1-11, S1-16, S1-17, and S1-22), HC value, and setoff value i (=14)}. In one embodiment, the programmable control unit 350 may compare the value S1-1 stored in the first node 1141, depicted in FIG. 11, with the indices S1-1 to S1-22.

In block 1430, the programmable control unit 350 may check if any of the indices, received from the regular path, match the index of the first node in any branch of the CAM tree or the CAM graph. The programmable control unit 350 causes control to pass to block 1435 on determining a match and to block 1490 otherwise. In one embodiment, the index S1-1 of the first node 1141 matches with S1-1 in the indices of the CAM hit information. The programmable control unit 350 may cause control to pass to block 1435.

In block 1435, the programmable control unit 350 may decrement the value of HC by 1. In block 1440, the programmable control unit 350 may increment the pointer X by K. As a result, the pointer X may equal 18 (=14+4).

In block 1445, the programmable control unit 350 may determine a character curr_char, in the message M0, pointed by the pointer X. In one embodiment, the programmable control unit 350 may determine curr_char to equal "a" as the pointer X (=18) points to the character "a".

In block 1450, the programmable control unit 350 may traverse the CAM tree or the CAM graph and may determine a variable echar, which corresponds to an edge connector between the first node and the next node. In one embodiment, the programmable control unit 350 may determine that the variable echar, which corresponds to an edge connector between the node 1141 and 1142 equals "a".

In block 1455, the programmable control unit 350 may check if the variable echar equals curr_char and control passes to block 1460 if the variable echar is not equal to curr-char and to block 1470 otherwise. As the variable echar equals curr-char control passes to block 1460.

In block 1460, the programmable control unit 350 may check if the variable echar equals "lamd" and control passes to block 1470 if the variable echar equals "lamd" and to block 1490 otherwise.

In block 1470, the programmable control unit 350 may assign the next node to the first node and a next CAM index of the list of CAM indices to the CAM index. In one embodiment, the programmable control unit 350 may designate the node 1142 to be the first node. The programmable control unit 350 may assign the index S1-6 of the second matching sub-message "lign" to the variable CAM index.

In block 1475, the programmable control unit 350 may check if the hit count equals 0 and control passes to block 1425 if the HC equals 0 and to block 1480 otherwise. In one embodiment, the programmable control unit 350 may repeat the blocks 1425 to 1475 six times before reaching the block 1480.

During the first iteration, the programmable control unit 350 may determine the presence of a first matching node equaling "newm" and a first edge connector "a". Likewise, in the second iteration, the programmable control unit 350 may determine a second matching node equaling "lign" and a second edge connector "a". In a third and a fourth iteration, the programmable control unit 350 may, respectively, determine a third matching node equaling "ntvi", and a third edge connector "r" and a fourth matching node equaling "usin" and a fourth edge connector "lamd". In the fifth and sixth iteration, the programmable control unit 350 may, respectively, determine a fifth matching node equaling "sint" and a fifth edge connector "h" and a sixth matching node equaling "enet".

In block 1480, the programmable control unit 350 may retrieve the string identifier stored in the end node. In one embodiment, the end node 1146 may store a string identifier identifying the string S1.

In block 1485, the programmable control unit 350 may generate a second signal indicating the presence of the pre-specified string S1 equaling "newmalignanatvirusinthenet" in the message M equaling "there are lot of new malignant virus in the net that affect the internet". In block 1490, the programmable control unit 350 may send a second signal indicating the absence of the pre-specified string in the message M0.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An apparatus comprising:
    a plurality of programmable processing units to receive a pre-specified string to generate content addressable memory entries based on non-contiguous portions of the pre-specified string, receive messages, and generate sub-messages from the messages, wherein length (K) of each of the sub-message is determined based on a length (Ls) of the pre-specified string, wherein K is less than Ls,
    a content addressable memory coupled to each of the plurality of programmable processing units to compare the content addressable memory entries and the sub-messages to generate hit information, and
    a programmable control unit coupled to each of the programmable processing units and the content addressable memory, wherein the programmable control unit is to determine the presence of the pre-specified string in the message based on the hit information.

2. The apparatus of claim 1, wherein a first programmable processing unit to generate content addressable memory entries based on non-contiguous portions of the pre-specified string.

3. The apparatus of claim 1, a second programmable processing unit to generate the sub-messages based on non-contiguous portions of the messages.

4. The apparatus of claim 3, wherein the second programmable processing unit is coupled to the content addressable memory to send the sub-messages to the content addressable memory and to receive the hit information from the content addressable memory.

5. The apparatus of claim 4, wherein the second programmable processing unit is coupled to the programmable control unit to send the hit information to the programmable control unit.

6. The apparatus of claim 1, wherein the hit information comprises indices of one or more content addressable entries that match the sub-messages.

7. The apparatus of claim 1, wherein the programmable control unit to generate a tree data structure based on the content addressable memory entries.

8. The apparatus of claim 7, wherein the programmable control unit to generate a graph data structure based on the content addressable memory entries, wherein the graph data structure comprises a single entry representing two or more content addressable memory entries that are identical.

9. The apparatus of claim 8, wherein the programmable control unit to traverse the tree to determine the presence of the pre-specified string.

10. The apparatus of claim 8, wherein the programmable control unit is to traverse the graph to determine the presence of the pre-specified string.

11. A method comprising
    generating content addressable memory entries based on non-contiguous portions of a pre-specified string,
    generating sub-messages from a message in response to receiving a message, wherein length (K) of each of the sub-message is determined based on a length (Ls) of the pre-specified string, wherein K is less than Ls,
    comparing content addressable memory entries with the sub-messages to generate hit information,
    generating a data structure based on indices of the content addressable memory entries, and
    traversing the data structure to determine the presence of the pre-specified string in a message based on the hit information.

12. The method of claim 11 further comprising generating the sub-messages based on non-contiguous portions of the message.

13. The method of claim 11, wherein the hit information comprises the indices of the content addressable memory entries that matches with the sub-messages.

14. The method of claim 12 further comprises sending the hit information to a programmable control unit if the hit information indicates a match between the content addressable entries and the sub-messages.

15. The method of claim 11, wherein generating the data structure further comprises generating a tree data structure based on the content addressable memory entries, wherein adjacent nodes of the tree data structure are linked by an edge connector.

16. The method of claim 15, generating the data structure further comprises generating a graph data structure based on the content addressable memory entries, wherein the graph data structure comprises a single entry representing two or more content addressable memory entries that are identical.

17. The method of claim 16, wherein traversing the data structure comprises traversing the tree data structure to determine the presence of the pre-specified string.

18. The method of claim 16, wherein traversing the data structure comprises traversing the graph data structure to determine the presence of the pre-specified string.

19. A machine-readable medium comprising a plurality of instructions that in response to being executed result in a processor
    generating content addressable memory entries based on non-contiguous portions of a pre-specified string,
    generating sub-messages from a message in response to receiving a message, wherein length (K) of each of the sub-message is determined based on a length (Ls) of the pre-specified string, wherein K is less than Ls,
    comparing content addressable memory entries with the sub-messages to generate hit information,
    generating a data structure based on indices of the content addressable memory entries, and
    traversing the data structure to determine the presence of the pre-specified string in a message based on the hit information.

20. The machine-readable medium of claim 19 comprises generating the sub-messages based on non-contiguous portions of the message.

21. The machine-readable medium of claim 19 comprises generating the hit information to comprise the indices of the content addressable memory entries that matches with the sub-messages.

22. The machine-readable medium of claim 20 comprises causing the hit information to be sent to a programmable control unit if the hit information indicates a presence of a match between the content addressable entries and the sub-messages.

23. The machine-readable medium of claim 19 comprises generating a tree data structure based on the content addressable memory entries, wherein adjacent nodes of the tree data structure are linked by an edge connector.

24. The machine-readable medium of claim 23 comprises generating a graph data structure based on the content addressable memory entries, wherein the graph data structure comprises a single entry representing two or more content addressable memory entries that are identical.

25. The machine-readable medium of claim 24 comprising traversing the tree data structure to determine the presence of the pre-specified string.

26. The machine-readable medium of claim 24 comprising traversing the graph data structure to determine the presence of the pre-specified string.

27. A network device comprising
a network interface to transfer a message,
a processor coupled to the network interface comprising
a first programmable processing unit to generate content addressable memory entries based on non-contiguous portions of a pre-specified string,
a second programmable processing unit to generate sub-messages based on non-contiguous portions of a message, wherein length (K) of each of the sub-message is determined based on a length (Ls) of the pre-specified string, wherein K is less than Ls, and
a programmable control unit to determine the presence of the pre-specified string in the message based on a hit information, and
a content addressable memory coupled to the processor to compare the content addressable memory entries and the sub-messages to generate the hit information.

28. The network device of claim 27 is a router.

29. The network device of claim 28 is the router supporting a fire-wall application.

30. The network device of claim 27 is a client system.

* * * * *